(12) United States Patent
Newman et al.

(10) Patent No.: US 10,221,578 B2
(45) Date of Patent: Mar. 5, 2019

(54) PERSONNEL PLATFORM

(71) Applicant: Intelligrated Headquarters, LLC, Mason, OH (US)

(72) Inventors: Murat Lee Newman, Leesburg, VA (US); Damian Jay Saunders, Hagerstown, MD (US); Jameson Paul Fitzpatrick, Hagerstown, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 15/603,008

(22) Filed: May 23, 2017

(65) Prior Publication Data
US 2017/0342727 A1 Nov. 30, 2017

Related U.S. Application Data

(60) Provisional application No. 62/340,680, filed on May 24, 2016.

(51) Int. Cl.
*E04G 5/14* (2006.01)
*E04G 3/28* (2006.01)
(Continued)

(52) U.S. Cl.
CPC .................. *E04G 3/28* (2013.01); *B61B 5/02* (2013.01); *B65G 43/00* (2013.01); *E04G 5/14* (2013.01);
(Continued)

(58) Field of Classification Search
None
See application file for complete search history.

(56) References Cited

U.S. PATENT DOCUMENTS 3,312,330 A * 4/1967 Juengel ................ B65G 15/105
198/369.2
4,163,480 A 8/1979 Highland
(Continued)

FOREIGN PATENT DOCUMENTS

JP 2010247600 A 11/2010
TW M392118 U 11/2010

OTHER PUBLICATIONS

International Search Report and Written Opinion of the International Searching Authority for International Patent Application No. PCT/US2017/34204, dated Aug. 16, 2017.

*Primary Examiner* — Kavel Singh
(74) *Attorney, Agent, or Firm* — Alston & Bird LLP

(57) ABSTRACT

A personnel platform facilitates maintenance on a loop sorter of a material handling system in a distribution center. The personnel platform includes wheeled axle assemblies, having left and right wheel hub assemblies connected by a lateral support structure, engaged for longitudinal travel to opposing wheel channels of a section bed of the loop sorter that guide a train of material handling carriages. The personnel platform also includes a carrier platform comprising multiple sub-platforms, such that each sub-platform is pivotally attached to an adjacent sub-platform. Further, the personnel platform includes a rail assembly having upright structures and side rail assemblies attached between an adjacent pair of upright structures. Further, the side rail assemblies extend and retract according to changing spacing between the adjacent upright structures as the personnel platform moves along a curved section.

14 Claims, 9 Drawing Sheets

(51) Int. Cl.
*E04G 3/00* (2006.01)
*B61B 5/02* (2006.01)
*B65G 43/00* (2006.01)

(52) U.S. Cl.
CPC .... *B65G 2207/40* (2013.01); *E04G 2003/283* (2013.01)

(56) References Cited

U.S. PATENT DOCUMENTS

| | | | |
|---|---|---|---|
| 5,439,093 A * | 8/1995 | Drewitz | B65G 47/1471 198/397.06 |
| 6,899,036 B2 * | 5/2005 | Lamb | B60L 13/04 104/281 |
| 7,337,892 B2 * | 3/2008 | Groot | B65G 17/066 198/369.3 |
| 7,762,387 B2 * | 7/2010 | Dunn | B65G 39/16 198/823 |
| 9,022,198 B2 | 5/2015 | Lykkegaard et al. | |

\* cited by examiner

PERSONNEL PLATFORM

CLAIM OF PRIORITY UNDER 35 U.S.C. § 119

The present Application for Patent claims priority to Provisional Application No. 62/340,680 entitled "Tilt Tray/Cross Belt Sorter Personnel Platform" filed 24 May 2016, and assigned to the assignee hereof and hereby expressly incorporated by reference herein.

BACKGROUND

The field of art disclosed herein pertains to personnel platforms and more particularly to personnel platforms used on material handling systems that carry and divert. discrete articles such as cartons, boxes, and pouches.

Material handling systems, such as loop sorters or tilt tray/cross belt sorters, transport articles along a conveyor track and divert them to specific destinations. These material handling systems require periodic servicing and/or inspection to prevent malfunction, or in certain cases, may require immediate maintenance and repair. These maintenance tasks are carried out by maintenance personnel who work directly on the material handling system to inspect and service the material handling system or components thereof. However, most material handling systems, such as in a warehouse, have a long stretch of conveyor track extending horizontally, and in some cases, in a multi-level, spiral, or circular configuration. Thus, it poses a challenge for the maintenance personnel to access all parts of the material handling system by walking on the site. Other means, such as using a ladder or a suspension means, pose a safety threat and have to be re-positioned constantly in order to access all parts of the material handling system along the conveyor track.

It is known to use a service cart that moves along the conveyor track for servicing and/or inspection of the material handling system. In one of such service carts, a personnel has to be in a prone position on the service cart to access various locations of the material handling system. However, certain inspection or maintenance functions are not well performed in a prone position. Further, an extended period in this position can be uncomfortable for the maintenance personnel.

BRIEF SUMMARY

The illustrative embodiments of the present disclosure provide a personnel platform that can be readily assembled onto a material handling system, such as a loop sorter, as needed. The personnel platform can navigate tight curves and spiral sections of the material handling system. The personnel platform is extendable to longitudinal lengths that enable more than one person to stand thereon. Safety features including handrails that telescope and twist on a curved and/or spiral portion of the material handling system prevent personnel from falling from the personnel platform.

According to at least one aspect of the present disclosure, a personnel platform for a material handling system that guides a train of material handling carriages is provided. The personnel platform includes a carrier platform for supporting a personnel. The carrier platform includes sub-platforms such that each sub-platform is pivotally attached to an adjacent sub-platform. The personnel platform further includes multiple wheeled axle assemblies, such that each wheeled axle assembly includes left and right wheel hub assemblies engageable for longitudinal travel to opposing wheel channels of a conveyor track of the material handling system. Each sub-platform is rigidly attached to a wheeled axle assembly and pivotally attached to the adjacent sub-platform. The pivotal attachment of the sub-platforms enables the personnel platform to move in a curving train along curved portions of the conveyor track. The personnel platform also includes a rail assembly having upright structures that are respectively attached to one of a selected sub-platform. The rail assembly further includes side rail assemblies mounted between a pair of adjacent upright structures. The side rail assemblies extend and retract according to changing spacing between the adjacent upright structures.

According to another aspect of the present disclosure, a method of mounting and assembling a personnel platform on a material handling system is provided. The method includes mounting at least two wheeled axle assemblies, each comprising left and right wheel hub assemblies, to opposing wheel channels on a section bed of the material handling system. A sub-platform is mounted between each pair of wheeled axle assemblies. Further, upright structures of a rail assembly are inserted into the wheel hub assemblies. The rail assembly also includes side rail assemblies that are installed between adjacent pair of upright structures. The side rail assemblies have at least one outer member that longitudinally and slidingly engages an inner member such that the side rail assemblies extend and retract according to changing space between the adjacent upright structures. Further, a drive unit crossbar is attached to a rearmost wheeled axle assembly and a drive unit wheel housing is installed onto the section. bed, attaching the drive unit wheel housing to the drive unit crossbar. A drive motor assembly is then attached on the drive unit wheel housing.

According to yet another aspect of the present disclosure, a material handling system. is provided. The material handling system includes a sorting conveyor having a conveying surface for transporting articles along a conveyor track. The material handling system further includes a personnel platform engageably moveable on the conveyor track. The personnel platform includes a carrier platform for supporting a personnel. The carrier platform includes sub-platforms such that each sub-platform is pivotally attached to an adjacent sub-platform. The personnel platform further includes multiple wheeled axle assemblies, such that each wheeled axle assembly includes left and right wheel hub assemblies engageable for longitudinal travel to opposing wheel channels of the conveyor track. Each sub-platform is rigidly attached to a wheeled axle assembly and pivotally attached to the adjacent sub-platform. The pivotal attachment of the sub-platforms enables the personnel platform to move in a curving train along curved portions of the conveyor track. The personnel platform also includes a rail assembly having upright structures that are respectively attached to one of a selected sub-platform. The rail assembly further includes side rail assemblies mounted between a pair of adjacent upright structures. The side rail assemblies extend and retract according to changing spacing between the adjacent upright structures.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE FIGURES

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used. to be examples with no indication of quality level. Like numbers refer to like elements throughout.

The word "exemplary," when used herein, is intended to mean "serving as an example, instance, or illustration." Any implementation described herein as "exemplary" is not necessarily preferred or advantageous over other implementations.

A personnel platform facilitates maintenance on a material handling system, such as a loop sorter, in a distribution center. The personnel platform includes at least three wheeled axle assemblies, each having left and right wheel hub assemblies connected by a lateral support structure are engaged for longitudinal travel to opposing wheel channels of a section bed of the loop sorter that guide a train of material handling carriages. A carrier platform having multiple sub-platforms such that each sub-platform is pivotally attached to an adjacent sub-platform and rigidly attached to a wheeled axle assembly. The personnel platform also includes a rail assembly having upright structures and side rail assemblies. The side rail assemblies are mounted between a pair of adjacent upright structures such that the side rail assemblies extend and retract according to changing spacing between the adjacent upright structures.

Turning now to the Drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details. In some instances, well known structures and components are shown in block diagram form in order to avoid obscuring such concepts.

Figure 1:
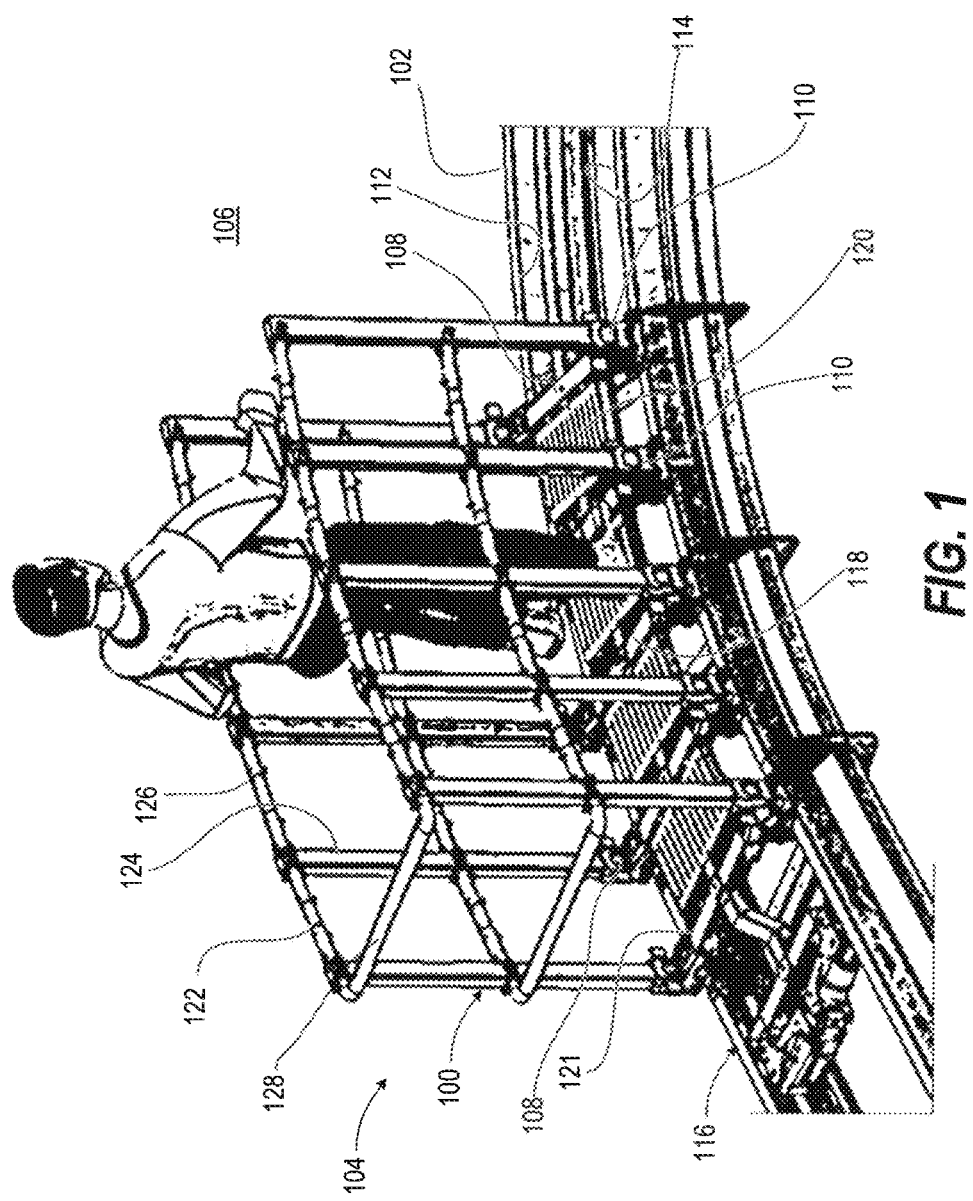
FIG. 1 illustrates a right rear isometric view of a personnel platform mounted onto a material handling system in a distribution center, according to one or more embodiments.

FIG. 1 illustrates a personnel platform 100 for maintenance on a loop sorter 102 of a material handling system 104 in a distribution center 106. The personnel platform 100 can be installed and removed by a single person even at an elevated location. The personnel platform, 100 includes at least three wheeled axle assemblies 108, such that each wheeled axle assembly includes a pair of left and right wheel hub assemblies 110. The left and right wheel hub assemblies are engageable for longitudinal travel to opposing left and right wheel channels 112, 114 of a section bed or a conveyor track 116 of the loop sorter 102. The wheel channels 112, 114 normally guide a train of material handling carriages that divert articles such as boxes, cartons, pouches, etc., by use of cross belts, tilt trays, etc. Each pair of wheel hub assemblies 110 is connected by a lateral support structure 118. The personnel platform 100 further includes a carrier platform having multiple sub-platforms 120. Each sub-platform 120 is attached between each pair of adjacent wheeled axle assemblies 108. The sub-platform 120 is rigidly attached to a wheeled axle assembly 108 and pivotally attached to an adjacent sub-platform 120. In an exemplary embodiment, the pivotal attachment is to the rear and permits the at least three wheeled axle assemblies 108 to move in a curving train along curved portions of the conveyor track 116. The rear most wheeled axle assembly 108 has a lateral crossbar 121 with, rearward extending drive bar 123 that serves as an attachment point for drive components discussed below.

The personnel platform 100 further includes a rail assembly 122 having upright structures 124 and side rail assemblies 126. The rail assembly 122 further includes an end railing assembly 128 attached across a pair of the upright structures 124 at an end of the personnel platform 100. In an exemplary embodiment, the end railing assembly 128 is attached across a pair of front most upright structures 124. The end railing assembly 128 may be a two-piece or a unitary assembly. Each upright structure 124 is respectively attached to one of a selected wheeled axle assembly 108 and a selected carrier sub-platform 120. In an exemplary embodiment, each left and right wheel hub assembly 110 has a top receptacle 130 that can receive an upright structure

124. The side rail assemblies 126 are attached between adjacent upright structures 124 such that the side rail assemblies 126 are telescopic, that is, the side rail assemblies 126 extend and retract according to changing spacing between the adjacent upright structures 124.

Figure 2:
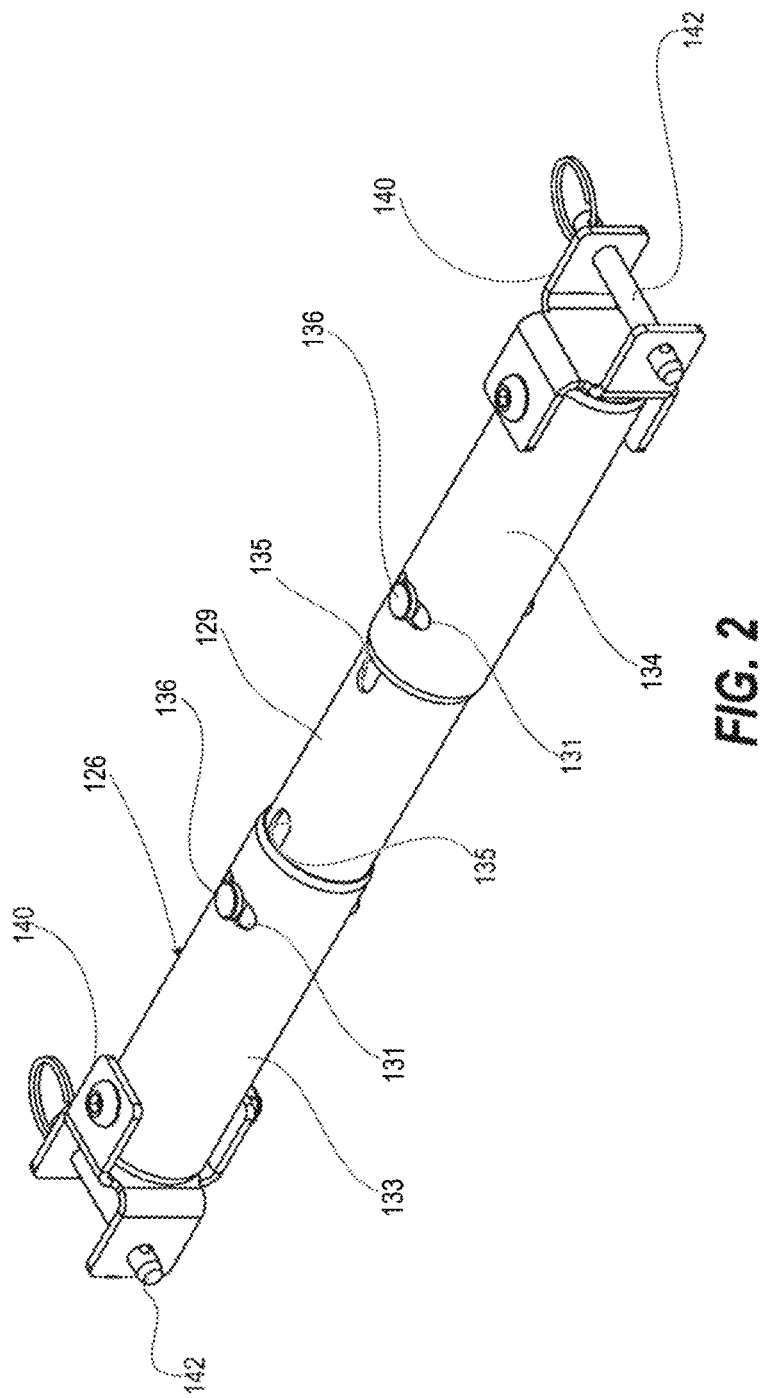
FIG. 2 illustrates an isometric view of a telescoping side rail assembly of the personnel platform of FIG. 1, according to one or more embodiments.

FIG. 2 illustrates a side rail assembly 126 of the personnel platform 100. The side rail assembly 126 includes an inner tube 129 slidably engaged between at least two outer tubes 133, 134. The inner tube 129 has outwardly spring-biased pins 136 that are received in longitudinal slots 135 formed in the inner tube 129 and radial slots 131 respectively formed in front and bad(outer tubes 133, 134. The outwardly spring-biased pins 136 are engaged for longitudinal sliding movement within the longitudinal slots 135 and radial twisting movement within the radial slots 131. Thus, the side rail assembly 126 extends, retracts, and twists according to changing spacing and level between the adjacent upright structures 124. In an exemplary embodiment, the inner tube 129 and the outer tubes 133, 134 may be covered by a covering tube (not shown) to prevent pinch hazard when a personnel holds the side rail assembly 126. Further, each side rail assembly 126 is attached to respective upright structures 124 by II-bracket 140 held in place by a quick release pin 142.

Figure 3:
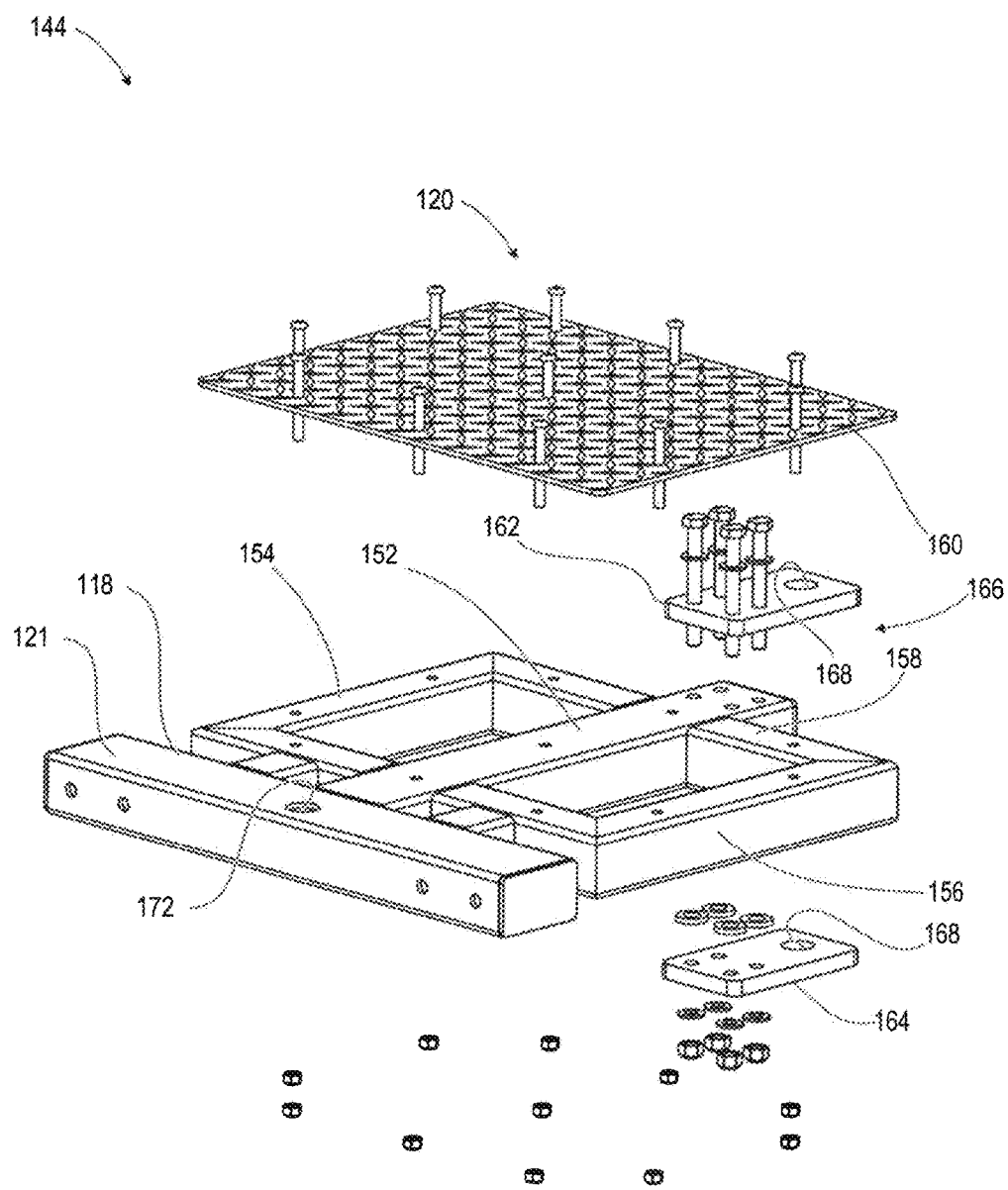
FIG. 3 illustrates an isometric, exploded view of a carrier weldment of the personnel platform of FIG. 1, according to one or more embodiments.

FIG. 3 illustrates a carrier weldment 144 including a sub-platform 120 that provides an operator of the personnel platform 100 a flat surface to stand-on. The sub-platform 120 includes a lateral crossbar 121. In an exemplary embodiment, the lateral crossbar 121 serves as the lateral support structure 118, as shown in FIG. 1, and is received on each lateral side by a corresponding wheel hub assembly 110. The sub-platform 120 includes a longitudinal crossbar 152 attached to a midpoint of the lateral crossbar 121. Left and right three-sided rectangular tubes 154, 156 are attached to each side of the longitudinal crossbar 152 to form a mounting surface 158 for a rectangular floor plate 160. In an exemplary embodiment, the rectangular floor plate 160 may have an anti-slip surface to provide a better grip to a personnel standing thereon. The sub-platform 120 further includes left and right tubes attached between backsides respectively of the left and right three-sided rectangular tubes 154, 156 and the lateral crossbar 121 to resist torsional loads on the mounting surface 158. A front end of the longitudinal crossbar 152 receives top and bottom distally extending plates 162, 164 that form a clevis bracket 166 with aligned vertical holes 168 to receive a clevis pin that also passes through a midpoint vertical hole 172 in another lateral crossbar 121. Further, the longitudinal. crossbar 152 of the sub-platform 120 is pivotally attached to a lateral crossbar 121 of an adjacent sub-platform 120 through the clevis pin. Thus, the sub-platforms 120 pivot with respect to each other at curved sections of the conveyor track 116, such that an inner diameter of the personnel platform 100 is less than an outer diameter of the personnel platform 100 at the curved section.

In an exemplary embodiment, the sub-platform 120 has a hi-metal configuration. The rear portion of the sub-platform 120 is made from a metal with high tensile strength, such as, but not limited to, steel. The front portion of the sub-platform 120 is made from another metal which is light in weight, such as, but not limited to, aluminum. The hi-metal design allows the sub-platform 120 to be strong enough to comply with the Occupational Safety & Health Administration (OSHA) Guiderail standards, and to be light enough to be carried and installed without requiring a hoisting device.

Figure 4A:
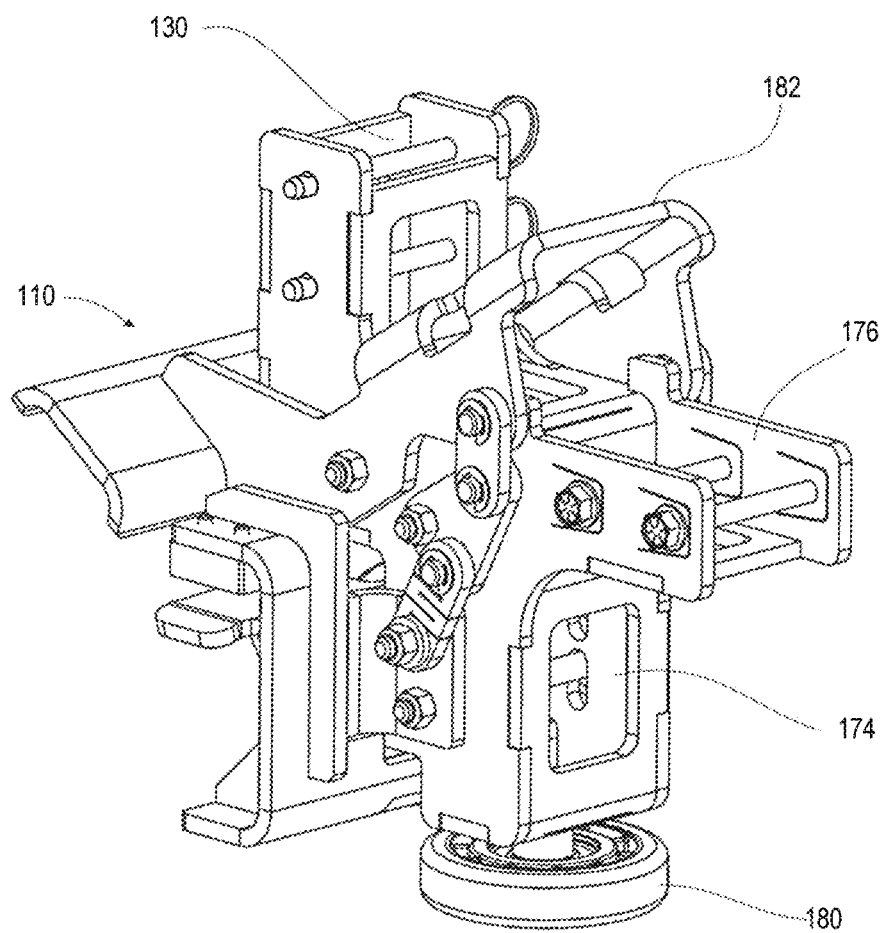
FIG. 4A illustrates an isometric, inside view of a wheel hub assembly of the personnel platform of FIG. I, according to one or more embodiments.
Figure 4B:
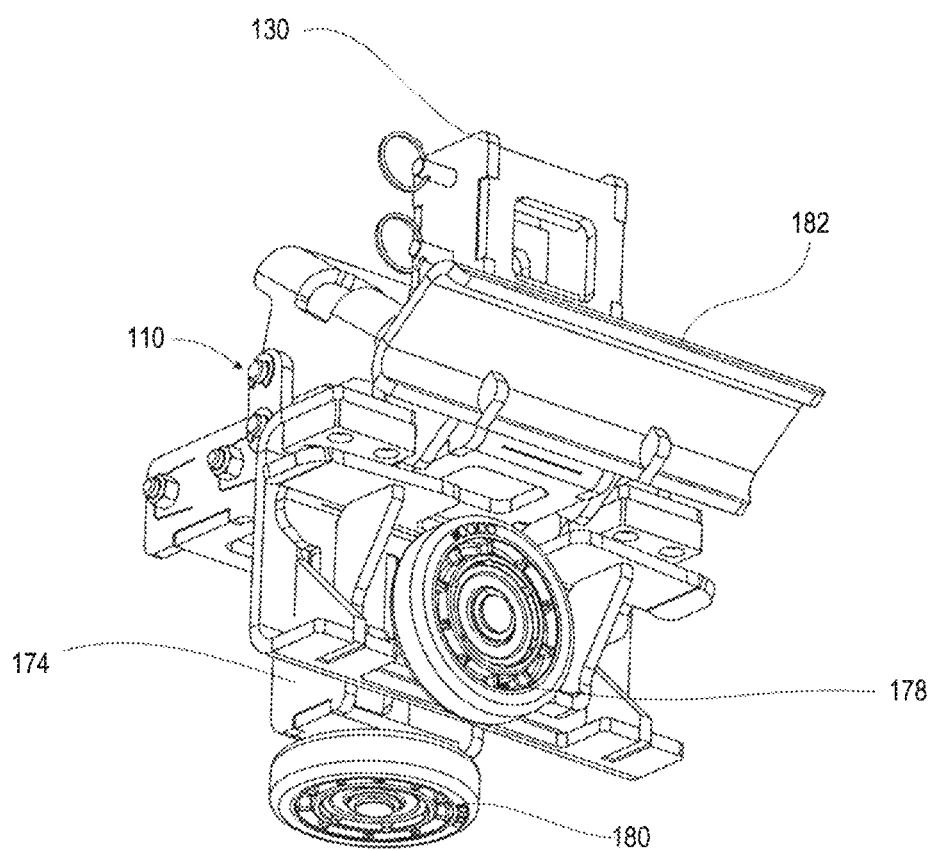
FIG. 4B illustrates an isometric, outside view of a wheel hub assembly of the personnel platform of FIG. 1, according to one or more embodiments.

FIGS. 4A and 4B illustrate a wheel hub assembly 110 having a main wheel hub weldment 174 that includes a top receptacle 130 and an inwardly projecting receptacle 176. The top receptacle 130 receives an upright structure 124. The inwardly projecting receptacle 176 is open from the top to receive one end of a lateral crossbar 121. On a lower outward surface, a rolling wheel 178, as shown in FIG. 4B, is vertically and longitudinally aligned to support the wheel hub assembly 110 for longitudinal movement. An alignment wheel 180 on a bottom surface of the main wheel hub weldment 174 is horizontally aligned to rotate about a vertical axis with its outward edge of its circumference positioned to prevent the side of the rolling wheel 178 from contacting the corresponding wheel channel 112, 114, as shown in FIG. 1.

Further, a pedal 182 is pivotally received by the main wheel hub weldment 174 to selectively engage the corresponding wheel channel 112, 114 of the conveyor track 116 of the loop sorter 102. To engage the pedal 182 with the wheel channel 112, 114, a personnel standing on the personnel platform 100 presses one end of the pedal downwards by his/her foot, thus, lifting the other end of the pedal 182 which engages with the wheel channel 112, 114. The pedal 182 When engaged with the wheel channel 112, 114 prevents longitudinal driving movement and vertical tipping movement of the personnel platform 100. Thus, the pedal 182 is used as a braking mechanism for the personnel platform 100.

Figure 5:
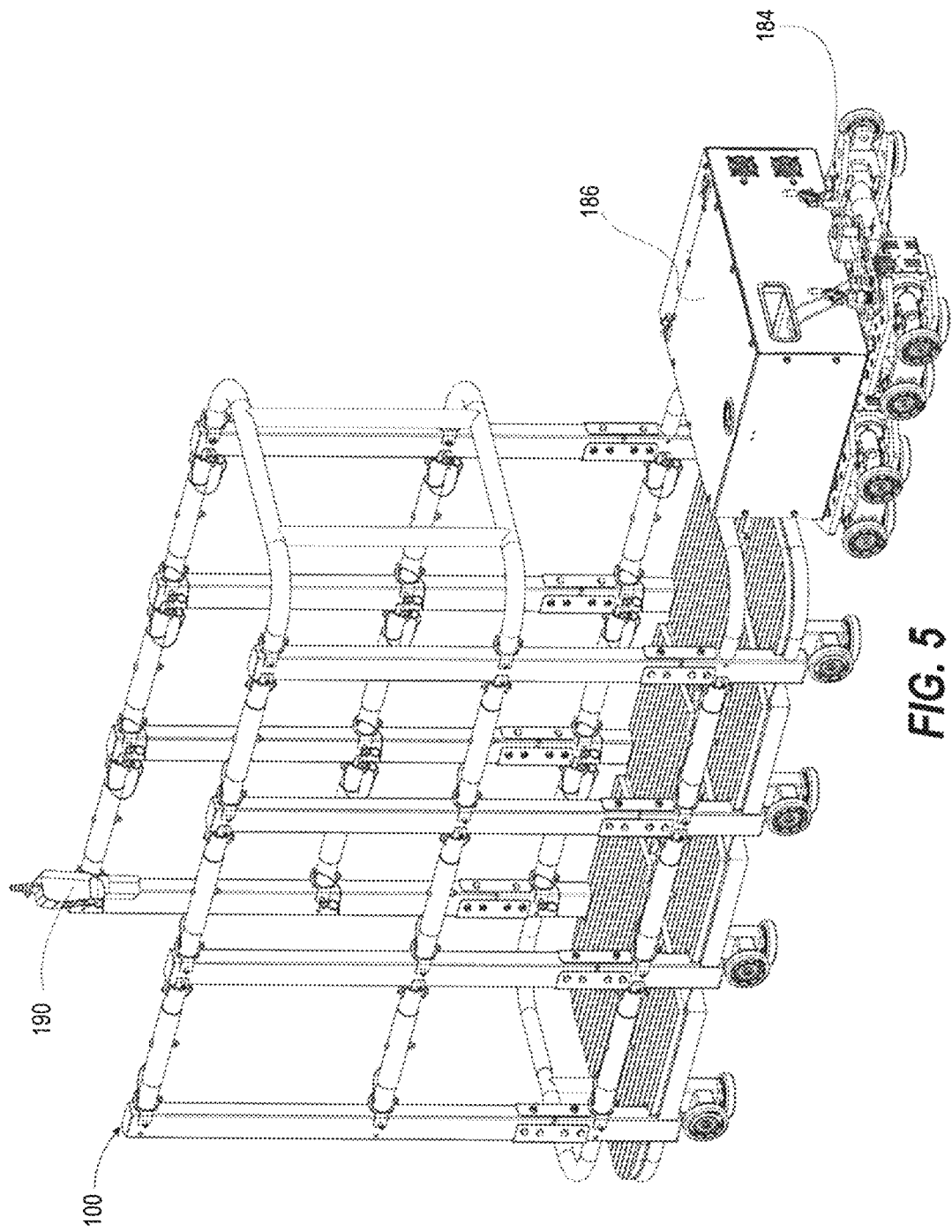
FIG. 5 illustrates an isometric view of a personnel platform mounted onto a material handling system in a distribution center, according to one or more embodiments.

FIG. 5 illustrates an exemplary personnel platform 100 that is a mobile working surface. The personnel platform 100 provides both fall protection and fall arrest features for installation, maintenance and auditing crew who are scheduled to work at elevated sections of a material handling system, such as a loop sorter. The personnel platform 100 can be operated on any length and configurations of the loop sorters, through straight, curve, level change, and spiral sections. Further, the personnel platform 100 can be configured based on the loop sorter's overhead clearance by assembling the upright structures in one of a full height, partial height, and Stowed configurations. The full height configuration provides both fall arrest and fall protection and can be used on loop sorters that have a minimum of 60" item clearance from the top surface of the loop sorter section. The partial height or double-stack configuration provides fall arrest feature and can be used on loop sorters that have an item clearance less than 60" from the top surface of the loop sorter section. For the partial height configuration the upright structures 124, at least one level of side rail assembly 126, and end railing assembly 128 are removed from the personnel platform 100. In the stowed configuration, all upright structures 124, side rail assemblies 126, and end railing assembly 128 are removed. The personnel platform 100 can be used with any width of carrier configurations, including both tilt tray and cross-belt carriers. The personnel platform 100 further clears other parts of a material handling system, such as, but not limited to, induction, chute, and side guards.

The personnel platform 100 consists of a series of modular components that do not require lifting tools. However, at least two installers are required to carry and install the components. Further, the personnel platform 100 does not require a dedicated service section for installation. It can be installed anywhere in a material handling facility or a distribution center that has at least 4 m straight span and flat surface next to it, such as, induction platforms.

In the exemplary embodiment, the personnel platform 100 includes four individual carriers or sub-platforms, 1× front carrier, 2× middle carrier, and 1× rear carrier. The carriers are attached to each other via a series of hitches and pinned keels. In addition to establishing a working surface, the front carrier provides an anchorage point for attaching a personnel safety harness. In an exemplary embodiment, the anchorage point is a 5000 lb. rated eyebolt. The rear carrier provides an additional hitch or a pivot point to connect the carrier to a drive unit (to be discussed later in this document). The rear carrier also provides an end railing structure as a part of fall protection feature of the personnel platform 100. Further, an end railing is attached between two upright structures, traverse to the side rail assembly 126, at one or both ends of the personnel platform 100. In an exemplary embodiment, the end railing is attached to one or both of a pair of opposite upright structures using quick release pins such that the end railing operates as a swinging door to the personnel platform 100. The quick release pins provide locking and hinging for the end railing which can swing open in both directions to allow easy entrance and exit for a personnel.

Further, as shown in FIG. 5, each carrier contains 2× upright structures and the gaps between the upright structures are filled with 18 articulating side rails. The side rails provide fall protection as specified in OSHA Fall Protection Guidelines. The articulating side rails contract, expand, twist, and rotate to allow the personnel platform 100 to go through curve, level change, and spiral sections of the loop sorter.

Figure 6:
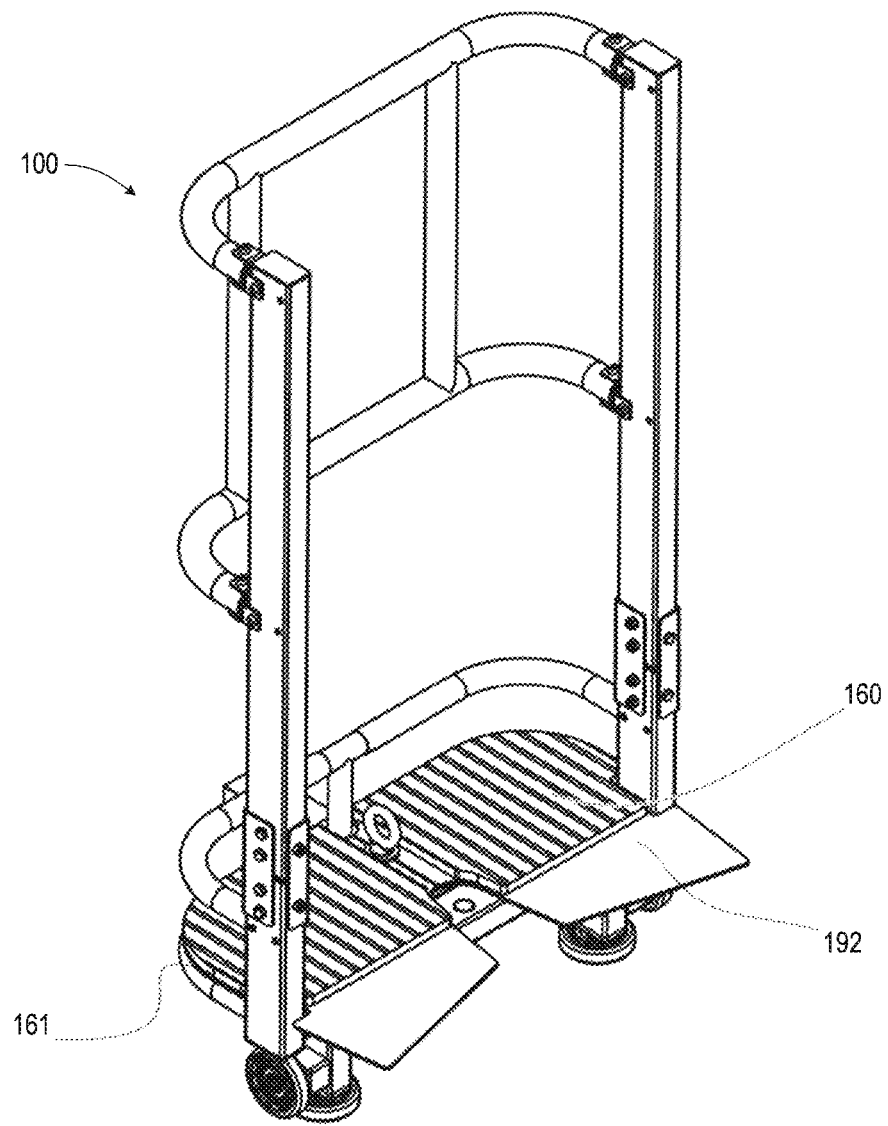
FIG. 6 illustrates an isometric view of a carrier of a personnel platform of FIG. 5, according to one or more embodiments.

FIG. 6 illustrates a rear portion of the personnel platform 100 in accordance with the exemplary embodiment. The personnel platform 100 provides protection against pinch hazard using a series of semi-concealed plastic joiner plates 192. As the personnel platform 100 moves through curved sections of the loop sorter, the distance between two consecutive carriers or sub-platforms 120 in the inner side of the curve disappears and creates a pinch hazard. One end of each plate 192 is fixedly attached to carrier or a sub-platform 120. In an exemplary embodiment, the plate is sandwiched between the rectangular floor plate 160 and a carrier frame 161. The other end of the plate 192 slides into the next carrier between the rectangular floor plate 160 and the carrier frame 161. The sandwiched end remains stationary with respect to the carrier that the sandwiched end is mounted onto, and the sliding end of the plate 192 slides within the adjacent carrier as the personnel platform 100 goes through the curved sections. Thus, the plate 192 covers the opening between the two carriers and provides protection against pinch hazard.

Figure 7:
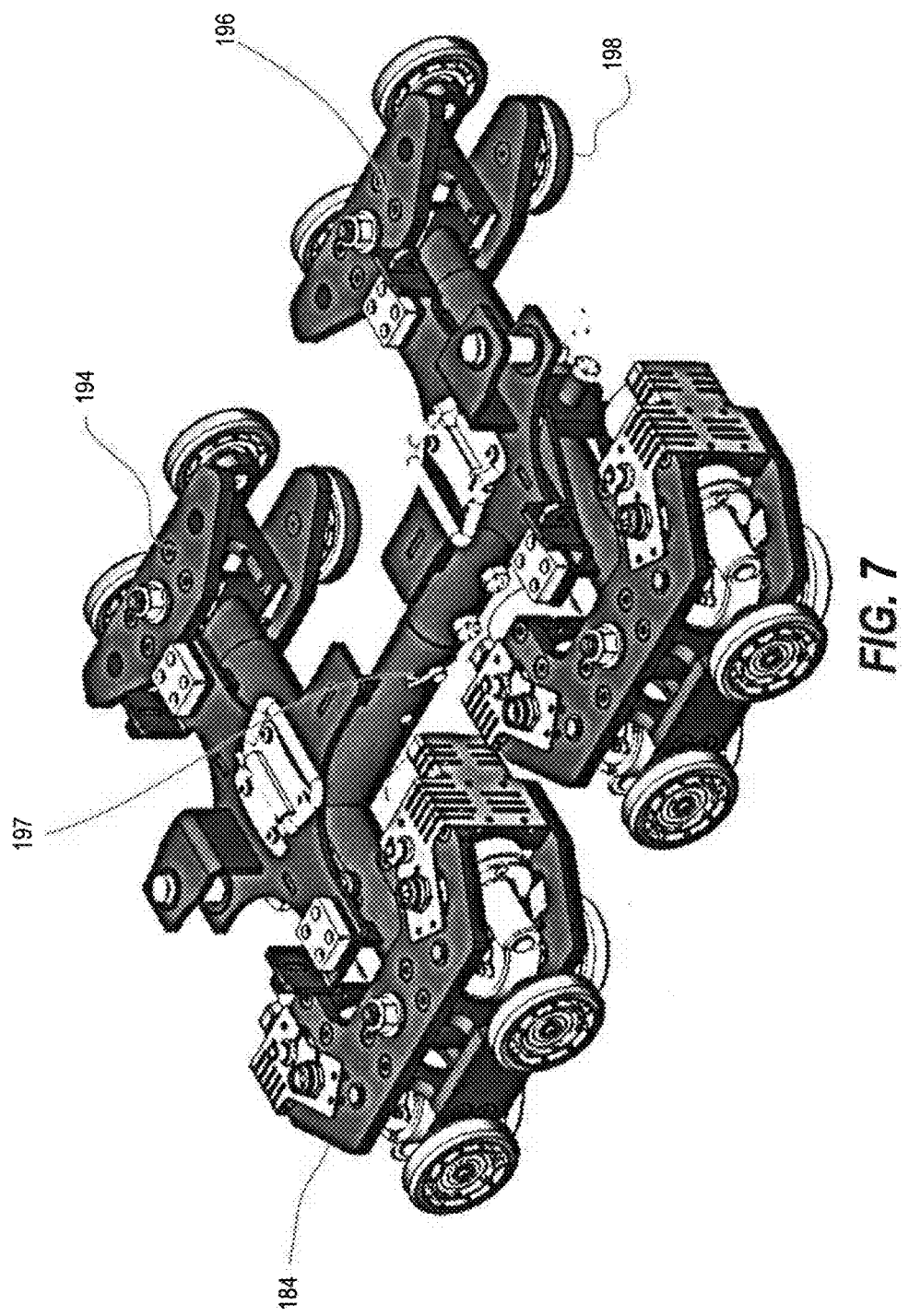
FIG. 7 illustrates an isometric view of a drive unit mounted to the personnel platform, according to one or more embodiments.

FIG. 7 illustrates a drive unit 184 of the personnel platform 100, in accordance with the exemplary embodiment. The personnel platform 100 uses the drive unit 184 as a battery powered friction drive system to self-propel and self-brake. In an exemplary embodiment, the drive unit 184 includes a motor powered by one or more batteries. The drive unit 184 propels the personnel platform 100 in forward and reverse direction along the conveyor track 116. The drive unit 184 includes two components, a front drive unit 194 and rear drive unit 196. The front drive unit 194 and the rear drive unit 196 are joined together by tubular connector 197 (male on the rear drive unit 196, female on the front drive unit 194). The tubular connector 197 has radial slots and pins received in the radial slots to enable the front drive unit 194 and the rear drive unit 196 to twist and pivot at curved, spiral, and level changing sections of the loop sorter.

Joined together, the front drive unit 194 and the rear drive unit 196 establish an electric friction drive that propels the carriers or sub-platforms when activated and brakes when not activated. The drive unit 184 further includes drive wheels 198 engageable to the wheel channels 112, 114. The drive unit 184 establishes a required traction via a mechanical expansion system that presses the drive wheels 198 against the wheel channel of the conveyor track with an expansion force. The traction is produced using gas springs (not shown) that are located within the drive unit 184. The gas springs are compressed using a screw driven mechanical advantage system. As a tensioning bolt is tightened, the bolt pushes a series of arms and levers and the tensioning force is transferred to the gas springs. As one end of the gas spring gets pushed the other end pushes the drive Wheels 198 towards the wheel channel at a controlled rate. In an exemplary embodiment, the expansion force is 600 lb. This traction is sufficient to drive and brake the personnel platform 100 as well as to keep the personnel platform 100 stationary under the impact of force during a fall arrest. In an exemplary embodiment, the drive unit 184 accelerates the personnel platform 100 to 1.2 m/s constant operating speed within 1.5 seconds and decelerates the personnel platform 100 to a full stop within 1.5 seconds. Further, as the personnel platform 100 travels over the loop sorter, the drive Wheels 198 may have to go over debris and surface imperfections. In such cases, the gas springs provide the necessary compliance and allow a constant thrust without slippage.

As shown in FIG. 5, the personnel platform 100 includes a control panel 186 mounted onto the drive unit 184. The control panel 186 is used to house control electronics, a control interface, battery packs, and general cabling. The control electronics are mounted on a removable plate for ease of access and serviceability. The control panel 186 also includes a cooling system to keep the control electronics at a desired temperature and to prevent overheating. In an exemplary embodiment, the control panel 186 has a primary activation switch, an emergency stop button, a toggle switch, and a digital voltage indicator. The control panel 186 also contains signal and power cables that are connected to a motor assembly when installed. Further, the control panel 186 has a lid and a compartment for receiving Battery Packs.

In an exemplary embodiment, the drive unit 184 includes 2× battery packs that are connected in series within the control panel 186. In addition to the primary Battery Packs, the personnel platform 100 may also include backup battery packs. The backup battery packs are not installed onto the personnel platform 100 but are kept at an installation location connected to a battery charger. In an exemplary embodiment, the battery charger has the capability to charge 2× Battery Packs from near 0% to 100% charge level within 1.5 hours.

The drive unit 184 receives an activation signal from the primary activation switch mounted on the control panel 186. In addition to the primary activation switch, the personnel platform 100 may also have a wired remote control or a pendant switch 190 that can be held at any location within the personnel platform 100. In an exemplary embodiment, the pendant switch 190 is mounted on the front carrier, as shown in FIG. 5. The pendant switch 190 provides an operator the ability to control the personnel platform 100 while observing the loop sorter at close range.

Further, the personnel platform 100 includes an attachment mechanism (not shown), such as a hook or a bolt, for attaching carts of a loop sorter to the personnel platform 100 to be able to push or pull the carts. The personnel platform 100 requires a cart chain gap in the loop sorter to operate within. In an exemplary embodiment, the required cart chain gap is 5 m to 20 m. When used on loop sorters of shorter length, the personnel platform 100 is mechanically connected to the cart chain via the attachment mechanism to tow the cart chain as it moves forward. In such use, the personnel platform 100 requires only 5 m cart chain gap. For large loop sorters, the personnel platform 100 may not be allowed to tow the cart chain. In such use the personnel platform 100 requires a minimum of 20 m cart chain gap to work within. When used in large loop sorters, the sorter must be jogged to move the cart chain gap as the personnel platform 100 advances to the end of the gap. When the sorter needs to be jogged, the personnel steps off the personnel platform 100, such as to a scissor lift or a nearby surface.

Figure 8:
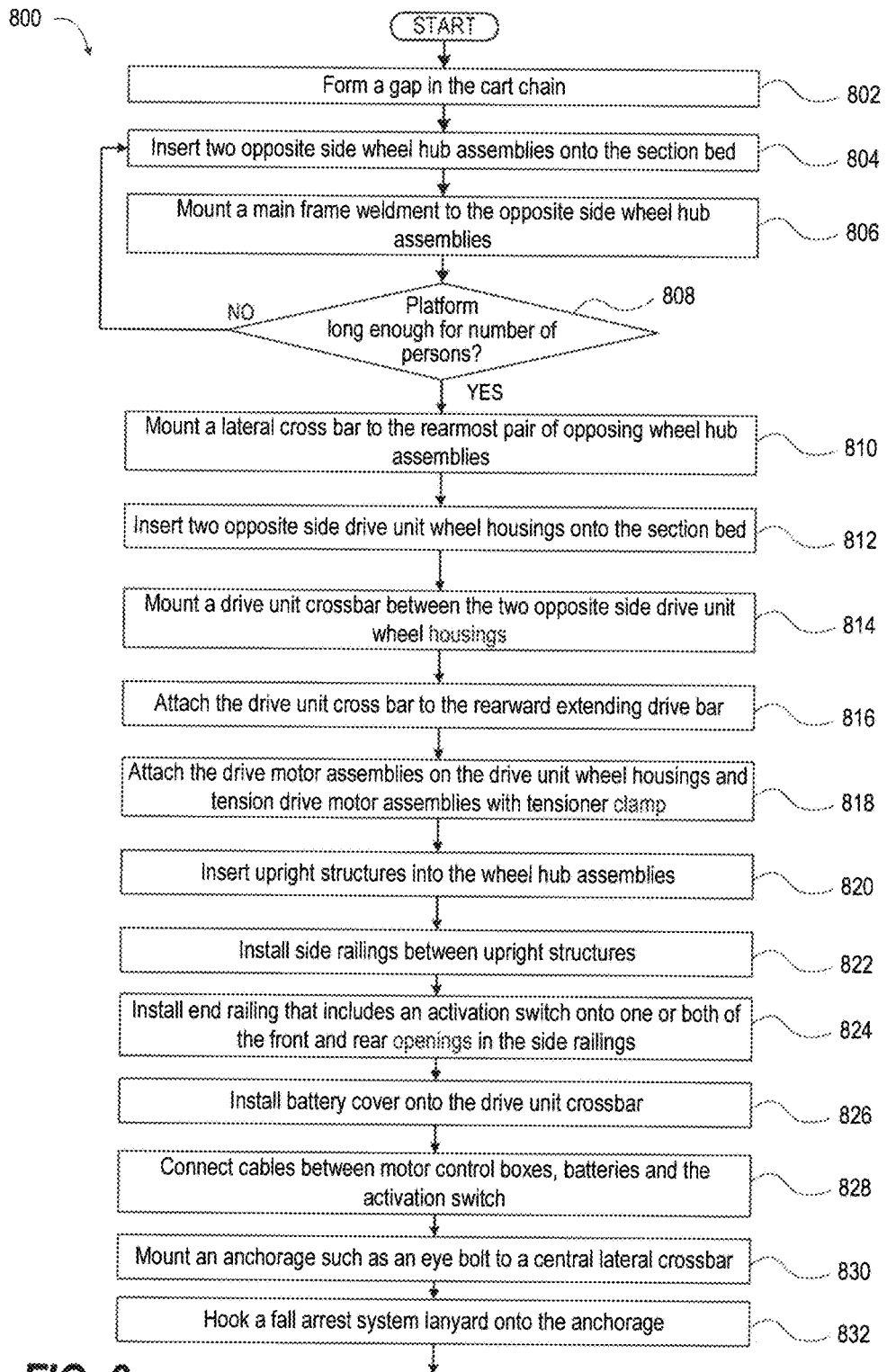
FIG. 8 illustrates a flow diagram of a method of assembling a personnel platform onto a section bed of a material handling system, according to one or more embodiments.

FIG. 8 illustrates a method 800 of assembling and mounting a personnel platform 100 on a material handling system, such as a loop sorter 102, as shown in FIG. 1. In an exemplary embodiment, the method 800 is automatically performed by an assembly device, such as, but not limited to, a robotic arm.

For mounting the personnel platform 100 on loop sorters 102 that use a cart chain, the method 800 includes forming a gap in the cart chain (block 802). Method 800 includes inserting two opposite side wheel hub assemblies 110, as shown in FIG. 1, onto the conveyor track or the section bed or conveyor track 116 (block 804). Method 800 further includes mounting a main frame carrier weldment, including a sub-platform 120, to the opposite side wheel hub assemblies 110 (block 806). Mounting the main frame carrier weldment comprises mounting the lateral crossbar 121, as shown in FIG. 3, to the two wheel hub assemblies 110. Method 800 includes repeating blocks 804-806 a number of time selected to achieve a desired length of the personnel platform 100. Each sub-platform 120 is rigidly attached to a lateral crossbar 121 and pivotally attached to an adjacent lateral crossbar 121. Further, in decision block 808, a determination is made as to whether the personnel platform 100 is sufficiently long to support a required number of personnel. In response to determining in decision block 808 that the personnel platform 100 is not long enough, method 800 returns to block 804. In response to determining in decision block 808 that the personnel platform 100 is long enough to support a required number of personnel, method 800 includes inserting upright structures 124, as shown in FIG. 1, into the main frame carrier weldment (block 810). Method 800 further includes installing side rail assemblies 126 between upright structures 124 (block 812).

In an additional embodiment, the method 800 further includes installing end railing 128 onto one or both of the front and rear openings in the side rail assembly 126 (block 814). Method 800 further includes mounting a lateral crossbar 121 to the rearmost pair of opposing wheel hub assemblies 110 (block 816). The method 800 includes inserting two opposite side drive unit wheel housings onto the section bed or conveyor track 116 (block 818). Method 800 includes mounting a drive unit crossbar between the two opposite side drive unit wheel housings (block 820) and attaching the drive unit crossbar to the rearward extending drive bar (block 822). Method 800 further includes attaching a drive motor assembly on the drive unit wheel housings (block 824). Additionally, method 800 includes installing a battery cover onto the drive unit crossbar (block 826). Method 800 includes connecting cables between motor control boxes, batteries, and an activation switch mounted on the personnel platform 100 (block 828). Method 800 further includes mounting an anchorage, such as, but not limited to, an eye bolt, to a central lateral crossbar (block 830). Method 800 includes hooking a fall arrest system lanyard onto the anchorage (block 832). FIG. 5 illustrates the assembled personnel platform 100.

As described above, the personnel platform 100 is designed to meet a number of requirements. The personnel platform 100 provides a safe working surface for a person either with a guiderail structure or an anchorage for fall arrest lanyards or both. The personnel platform 100 complies with the Occupational Safety & Health Administration (OSHA) Fall Protection Standards. The personnel platform 100 is capable to operate on straight, curved, spiral, and level changing sections of the material handling system. The personnel platform 100 is capable to advance on the material handling system without removal from and reinstallation onto the material handling system. Further, the personnel platform 100 can withstand the impact load due to a person falling from the personnel platform 100 in any direction. The platform does not require hoisting for installation onto or removal from the material handling system. The weight of the heaviest inseparable assembly of the personnel platform 100 does not exceed the lifting capability of an average person (e.g., 50 lbs. maximum by OSHA Heavy Lifting Standards).

Further, the personnel platform 100 does not require a service section for installation onto or removal from the material handling system. This feature makes the personnel platform 100 compatible with the existing material handling systems that do not have a service section. The personnel platform length is modifiable and can be customized for two or more workers as permissible by the cart chain gap.

When used with multi-level material handling systems, such as double stack sorters, that do not permit a standing height, all or a portion of the rail assembly of the personnel platform 100 is removable with the personnel platform 100 serving as a moving anchorage point for fall protection. As described above, in an exemplary embodiment, the personnel platform is propelled by a drive unit having two battery powered electric motors operated by a personnel. The drive unit is independent from the cart chain motion of the material handling system and enables the personnel platform to move from the beginning of a gap created in the material handling system to the end. Thus, eliminating the need for dismantling and reinstallation of the personnel platform in order to displace it.

It must be noted that, as used in this specification and the appended claims, the singular forms "a," "an" and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A personnel platform comprising:
   a carrier platform comprising at least two sub-platforms, wherein each sub-platform is pivotally attached to an adjacent sub-platform;
   a plurality of wheeled axle assemblies that each comprise left and right wheel hub assemblies engageable for longitudinal travel to opposing wheel channels of at least one conveyor track, wherein each sub-platform is attached to at least one wheeled axle assembly; and
   a rail assembly comprising:
   at least two upright structures attachable to one of the at least two sub-platforms; and
   at least one side rail assembly mounted between an adjacent pair of the at least two upright structures, wherein the side rail assembly comprises an inner tube with longitudinal slots and at least one outer tube with radial slots to facilitate longitudinal sliding movement and radial twisting movement according to changing space between the adjacent upright structures.

2. The personnel platform of claim 1, further comprising a drive unit attachable at a pivot point to a selected one of a leading or trailing sub-platform and having drive wheels engagable to the at least one conveyor track and activated by the drive unit.

3. The personnel platform of claim 2, wherein the drive unit comprises at least one motor.

4. The personnel platform of claim 2, wherein the drive unit:
   operates the personnel platform in a forward direction by propelling the personnel platform along the at least one conveyor track in the forward direction;
   operates the personnel platform in a reverse direction by propelling the personnel platform along the at least one conveyor track in the reverse direction; and
   stops the personnel platform by pressing the drive wheels against the at least one conveyor track with an expansion force.

5. The personnel platform of claim 2, wherein the drive unit comprises a mechanical expansion system that presses the drive wheels against the at least one conveyor track with an expansion force to brake the personnel platform.

6. The personnel platform of claim 1, further comprising a pedal that selectively engages the corresponding wheel channel to prevent longitudinal driving movement and vertical tipping movement of the personnel platform.

7. The personnel platform of claim 1, wherein the sub-platform is pivotally attached at a midpoint of a lateral crossbar of an adjacent sub-platform.

8. The personnel platform of claim 1, further comprising a plate provided between adjacent sub-platforms such that one end of the plate is fixedly attached to a sub-platform and another end is adapted to slide into the adjacent sub-platform as the carrier platform moves along a curved section of the at least one conveyor track.

9. The personnel platform of claim 1, wherein the inner tube includes one or more outwardly spring-biased pins that are received in the radial slots formed in the at least one outer tube such that at least a portion of the side rail assembly is adapted to twist when the carrier platform moves along spiral sections of the at least one conveyor track.

10. The personnel platform of claim 1, wherein the inner tube with the one or more outwardly spring-biased pins are received in the longitudinal slots engaged for the longitudinal sliding movement to the inner tube by a clevis pin such that the side rail assembly extends and retracts when the carrier platform moves along curved sections of the at least one conveyor track.

11. The personnel platform of claim 1, wherein the rail assembly further comprises at least one end railing attachable between two upright structures, traverse to the side rail assembly, at an end of the personnel platform, wherein the end railing when attached to one upright structure operates as a swinging door to the personnel platform.

12. The personnel platform of claim 1, wherein at least one upright structure is assembled from two more vertical portions that can be selectively installed in one of: (i) full height; (ii) partial height; and (ill) stowed configurations to accommodate restrictive overhead clearance spaces.

13. The personnel platform of claim 1, further comprising an attachment mechanism for attaching one or more material handling carriages to the personnel platform such that the personnel platform pulls or pushes the material handling carriages when in motion.

14. The personnel platform of claim 1, wherein the personnel platform further comprises an anchorage point for attaching a personnel safety harness.

* * * * *